UNITED STATES PATENT OFFICE.

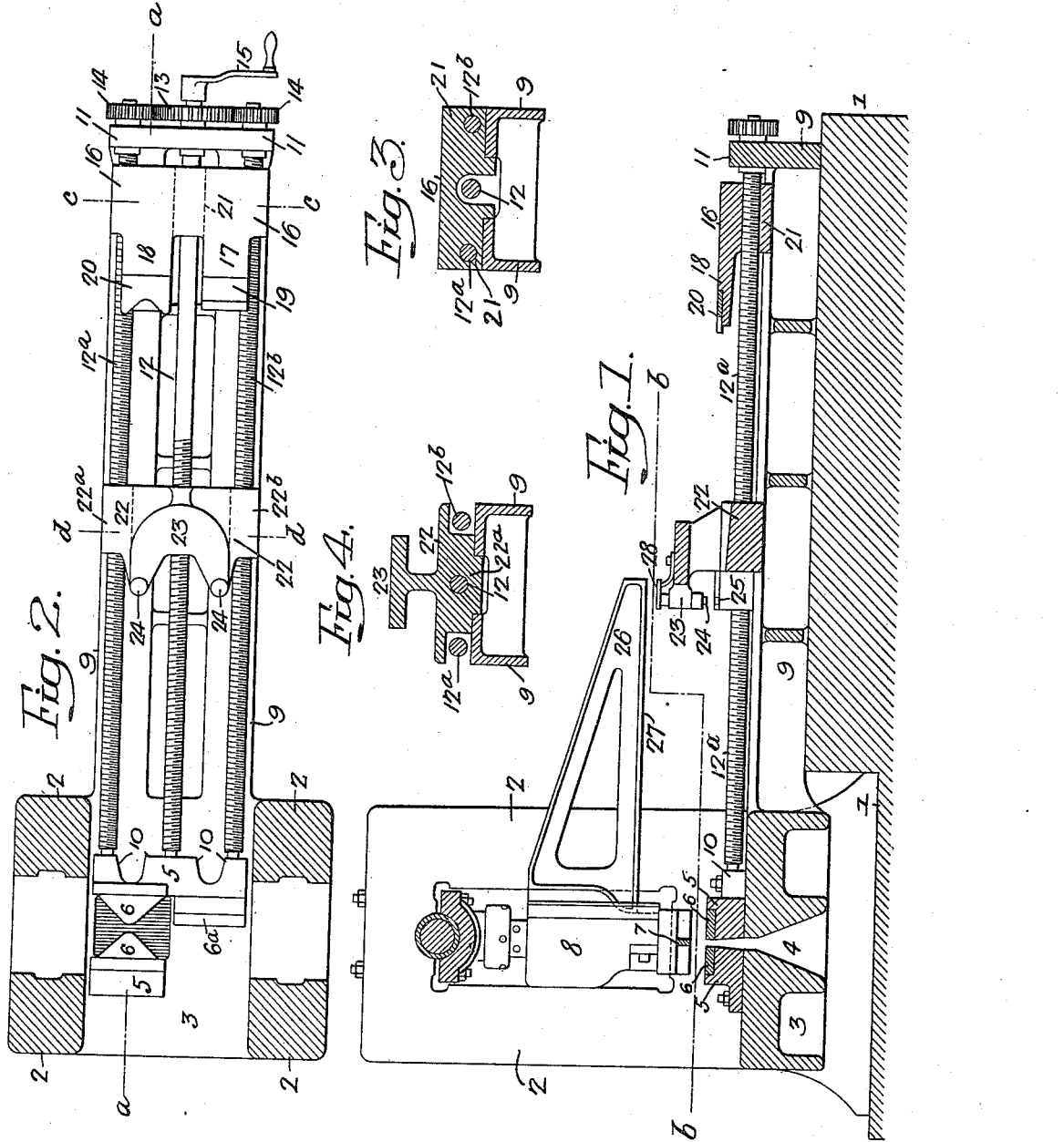

LAWFORD H. FRY, OF YEAGERTOWN, AND AMOS G. COLE AND WALTER H. FOSTER, OF LEWISTOWN, PENNSYLVANIA.

SPRING SHEARING AND NIBBING MACHINE.

1,192,616.      Specification of Letters Patent.      Patented July 25, 1916.

Application filed April 10, 1915. Serial No. 20,575.

*To all whom it may concern:*

Be it known that we, LAWFORD H. FRY, a British subject, and AMOS G. COLE and WALTER H. FOSTER, citizens of the United States, I, the said FRY, being a resident of Yeagertown, Mifflin county, Pennsylvania, and we, the said COLE and FOSTER, being residents of Lewistown, Mifflin county, Pennsylvania, have invented certain Improvements in Spring Shearing and Nibbing Machines, of which the following is a specification.

One object of our invention is to improve the construction of shearing machines particularly adapted for shearing spring plates.

A further object of the invention is to combine with the shearing machine a nibbing punch which will punch the plate simultaneously with the cutting operation.

A still further object of the invention is to provide automatic means for adjusting the nibbing punch so that it will be automatically central with respect to the stop and shears.

Another object of the invention is to make a double machine so that it can be used for shearing round end plates or straight end plates, as desired.

In the accompanying drawings:—Figure 1, is a central elevation on the line *a—a*, Fig. 2, illustrating our improved shearing and nibbing machine; Fig. 2, is a central plan view on the line *b—b*, Fig. 1; Fig. 3, is a central view on the line *c—c*, Fig. 2; and Fig. 4, is a sectional view on the line *d—d*, Fig. 2.

In the drawings, we have illustrated a double machine, one set of cutters arranged to cut round end plates and the other set of cutters arranged to cut straight end plates.

1 is the foundation, on which is mounted the housings 2. 3 is the base firmly secured to the housings. In the present instance both sets of cutters are arranged between standards of the housings and between the dies of the round end cutters in the base 3 is an opening 4 through which drops the waste sheared from the plate, as it will be understood that by the round end cutters there is a section of the plate cut to waste, while the straight end cutters simply sever the plate without waste.

5, 5 are the die blocks of the round end cutter.

6, 6 are the dies mounted on the blocks and beveled as shown, preferably rounded to any degree desired.

7 is the upper die conforming to the shape of the lower dies 6 and carried by the plunger 8, which also carries the straight upper blade which works in conjunction with the blade 6$^a$ mounted on the base 3. The plunger may be operated in any manner common to this type of machine and, in the present instance, there is an overhead shaft mounted in the housings and connected to the plunger by a crank, not shown. We lay no claim to this feature of the device as it will be understood that the plunger may be operated by hydraulic mechanism, or air under pressure, if found desirable.

Extending from the base 3 is a frame 9 and mounted in a bearing 10 on the base and in a bearing 11 on the frame are three screw rods 12, 12$^a$ and 12$^b$, spaced a given distance apart, as shown clearly in Fig. 2, and geared together, as shown. The gear wheel 13 on the screw rod 12 is twice the diameter of the gears 14 on the screw rods 12$^a$ and 12$^b$.

15 is a handle mounted on the central screw rod, in the present instance, so that on turning this handle the screw rods 12$^a$ and 12$^b$ will be turned twice as fast as the center rod 12.

Mounted on the frame is a stop gage carriage 16 having two projections 17 and 18 on which are gage plates 19 and 20, respectively. The gage plate 19 is for use in connection with the straight end spring plates, while the gage plate 20 is shaped to receive round end spring plates. On the gage carriage 16 are nuts 21, the threads of which mesh with the threads of the side screw rods 12$^a$ and 12$^b$, so that, when the said rods are turned, the gage plate will move longitudinally in either direction, according to the direction of movement of the screw.

Located between the gage and the shears and mounted on the frame 9 is a carriage 22 carrying a nibbing punch 23 having a plunger 24 and a fixed die 25. There are two of these punches, one in line with the straight end shears and the gage plate and the other in line with the round end shears and gage plate. This carriage 22 has a nut 22ª through which passes the screw 12 and the thread of this screw meshes with the threads of the nut, so that, when the screw is turned, the carriage is moved longitudinally and, as the screw is geared two-to-one to the screw rods 12ª and 12ᵇ the carriage 22, carrying the nibbing punches, will move exactly one-half the distance of the gage carriage 16 and, consequently, it will always punch a hole at the center of the spring plate, irrespective of the length thereof.

On the plunger 8 of the shears is an arm 26, which extends over the plungers 24 of the nibbing punch 23 mounted on the carriage 22, and the under surface 27 of this arm is straight and the punch has a flattened portion 28 with which the arm comes in contact when the plunger 8 is forced down to make the cut, so that, no matter in what position the carriage 22 is adjusted, the arm will strike the portion 28 and will force the nibbing punch down to make a hole or depression in the spring plate.

It will be noticed that the round end cutters shear a comparatively narrow waste piece from the plates so as to finish not only the end of the section between the gage carrier and the punch, but also the forward end of the succeeding section to be cut.

The operation of the machine is as follows:—The gage carriage and nibbing punch carriage are adjusted by turning the crank handle 15 so that there will be a given distance between the cutting dies 7 and the gage plate 19, if a straight end plate is to be cut. This brings the nibbing punch directly in the center between these two elements and the plate spring strip to be cut is fed into one end of the machine and against the gage plate 19. The plunger 8 is depressed, cutting a section from the strip and also punching a hole or depression at the center of the plate. This section is removed and the strip is fed into position again and the operation is repeated.

While we have shown a double machine arranged to punch either straight end plates or round end plates, a single machine may be used and the cutting dies and gage plates may be removable, so that a round end plate or a straight end plate can be punched on the machine.

While we have shown three screws, one of which controls the movement of the nibbing punch and the other two control the movement of the gage carriage, two screws may be used, one arranged to control the gage carriage and the other the nibbing punch carriage. Other equivalent means may be used instead of the screws for limiting the movement of the two carriages so that the nibbing punch will always be located centrally between the gage and the cutter to insure the punch of the plate at the center thereof.

We claim:—

1. The combination in a spring plate shearing and nibbing machine, of a punch; a gage for the plate; a nibbing punch located between the gage and the shearing die; and means for moving the two elements in unison so that the nibbing punch will always be located centrally with respect to the ends of the sheared plate.

2. The combination in a shearing and nibbing machine, of a shearing die; a gage carriage and a nibbing punch carriage; a screw for actuating the gage carriage and a screw for actuating the punch carriage, said screws being so geared together that, when one of the screws is turned, the gage carriage will travel in a given relation to the punch carriage.

3. The combination of a housing; a lower die; a plunger; an upper die carried by the plunger; a frame projecting from the housing; a gage carriage mounted on the frame; a punch carriage also mounted on the frame between the housing and the gage carriage; means for actuating the two carriages in unison so that the gage carriage will move twice the distance of the punch carriage; a punch plunger on the punch carriage; and an arm on the shearing plunger arranged to come in contact with and to depress the punch plunger simultaneously with the cutting of the strip.

4. The combination in a shearing and nibbing machine, of housings; a base located between the housings; a round end die and a straight end die mounted on the base; a plunger having cutters corresponding with the dies; a frame projecting from the base; a gage carriage mounted on the frame; a nibbing punch carriage also mounted on the frame between the gage carriage and the base; the nibbing punch carriage having two punches, one in line with one set of cutters and the other in line with the other set of cutters; a carriage having two gage plates, one in line with one set of cutters and the other in line with the other set of cutters; and means for moving the gage carriage and punch carriage in unison.

5. The combination of housings; a base; a plunger; two sets of cutting dies mounted on the base and plunger; a frame extending from the base; a gage carriage mounted on the frame and having two gage plates, one in line with one shearing die and the other in line with the other shearing die; a nibbing punch carriage, also mounted on the frame between the gage carriage and the shears, having two punches, one in line with one shearing die and the other in line with the other shearing die; three longitudinal screws; gears on one end of each screw; nuts on the gage carriage, the threads of which mesh with the threads of the side screws; and a nut on the punch carriage having threads meshing with the threads of the central screw, the gear on the central screw being twice the diameter of the gears on the side screws so that, when one of the shafts is turned, the punch carriage will be moved one-half the distance of the gage carriage.

LAWFORD H. FRY.
AMOS G. COLE.
WALTER H. FOSTER.